(12) United States Patent
Funaba et al.

(10) Patent No.: US 6,279,343 B1
(45) Date of Patent: Aug. 28, 2001

(54) HIGH TEMPERATURE REGENERATOR FOR ABSORPTION WATER COOLING AND HEATING MACHINE

(75) Inventors: Yasushi Funaba, Tsuchiura; Norihiro Itou, Ibaraki-ken; Tomihisa Ohuchi, Tsukuba; Satoshi Miyake, Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/381,397

(22) PCT Filed: Nov. 11, 1998

(86) PCT No.: PCT/JP98/05077

§ 371 Date: Sep. 20, 1999

§ 102(e) Date: Sep. 20, 1999

(87) PCT Pub. No.: WO99/24768

PCT Pub. Date: May 20, 1999

(30) Foreign Application Priority Data

Nov. 12, 1997 (JP) .................................................. 9-310124

(51) Int. Cl.[7] .................................................. F25B 33/00
(52) U.S. Cl. .............................................. 62/497; 62/476
(58) Field of Search ........................................ 62/497, 476

(56) References Cited

U.S. PATENT DOCUMENTS

| | | | |
|---|---|---|---|
| 3,367,137 | * | 2/1968 | Whitlow ................................ 62/497 |
| 4,487,036 | * | 12/1984 | Itoh et al. ............................... 62/474 |
| 4,573,330 | * | 3/1986 | Van Der Sluys et al. ............. 62/476 |
| 5,435,154 | * | 7/1995 | Nishiguchi et al. ................... 62/476 |
| 5,704,225 | * | 1/1998 | Sawakura et al. ..................... 62/497 |
| 5,724,829 | * | 3/1998 | Schubach et al. ..................... 62/497 |
| 5,862,679 | * | 1/1999 | Nakamura et al. .................... 62/497 |

* cited by examiner

*Primary Examiner*—William Doerrler
*Assistant Examiner*—Mark Shulman
(74) *Attorney, Agent, or Firm*—Antonelli, Terry, Stout & Kraus, LLP

(57) ABSTRACT

A high temperature regenerator for an absorption water cooling and heating machine for extracting steam as coolant by heating and condensing a dilute solution of lithium bromide. An inner casing (2) defines therein a combustion chamber (11B) on the blow out port side of a burner for blowing out combustion gas. The solution is filled in liquid chambers defined in an outer casing (1) above and below the combustion chamber. A coolant vapor outlet passage (8) is defined in the upper part of the outer casing, and gas exhaust passages (13, 14) are defined in the combustion chamber on a side remote from the burner. A plurality of solution tubes 3 communicated with the liquid chambers above and below the combustion chamber are extended through he combustion chamber. The plurality of solution tubes are plane tubes having fins (16) at their side surfaces. The fins are provided only on the upstream side. With these fins, the heat-exchange between the solution filled in the plane tubes and the combustion gas can be promoted so as to promote the flow of the solution.

5 Claims, 13 Drawing Sheets

(a)  (b)  (c)

(a)

(b)

(c)

HIGH TEMPERATURE REGENERATOR FOR ABSORPTION WATER COOLING AND HEATING MACHINE

TECHNICAL FIELD

The present invention relates to a high temperature regenerator for an absorption water cooling and heating machine, and in particular a high temperature regenerator for an absorption water cooling and heating machine, which improves boiling and flowing of a lithium bromide solution (LiBr solution) heated in the high temperature regenerator and which is suitable for lessening corrosion and deterioration of a liquid side heat transfer surface of the high temperature regenerator.

BACKGROUND OF TECHNOLOGY

Conventionally, there have been known several kinds of high temperature regenerators for absorption water cooling; and heating machines, for example, Japanese Laid-Open Patent No. H8-193767 discloses a high temperature regenerator for an absorption water cooling and heating machine. Specifically, this high temperature regenerator has such a structure that a large number of solution tubes which communicates the upper and lower parts of a liquid chamber with each other, are arranged, standing close together, in a passage for combustion gas from a burner within the high temperature regenerator. The large number of solution tubes are divided into two groups, that is, two tube banks one of which is located in the vicinity of the burner so as be directly exposed to the flame, and the other one of which is located distant from the burner, and between which a space with no tubes standing close together, is defined. With this arrangement, the temperature of the flame can be lowered by causing the flame to impinge upon the tube bank located in the vicinity of the burner in order to restrain the generation of thermal NOx, thereby it is possible to aim at lowering the emission of NOx.

Alternatively, Japanese Patent Laid-Open H9-42800 proposes a high temperature regenerator in which dilute solution fed by a solution pump flows through a heat-exchanging tube bank located in the vicinity of a burner and having a high heat flux so as to effect forced convection.

However, the solution tubes in the above-mentioned prior art arrangements, all have circular cross-sectional shapes. In a liquid tube type high temperature regenerator using heat-exchanging tubes having circular cross-sectional shapes, liquid and vapor flow in only one vertically upward direction, and accordingly, all tubes exhibits a one-dimensional flow so as to cause boiling and rising streams. Meanwhile, combustion within the tube bank causes combustion gas to have a high temperature therewithin, accordingly, the heat flux of the solution tubes becomes higher. Conventionally, the higher the heat lux of the solution tubes which stand upright and have circular cross-sectional shapes, the larger the volume of produced vapors within the tubes, the flowing resistance is increased, and as a result, the circulating volume of the solution itself is reduced so that the concentration of the solution becomes locally higher at the heat-transfer surface. Thus, it has been found that the heat-transfer surface is corroded and deteriorated.

That is, if the heat flux of the solution tubes is high, the temperature of the walls of the solution tubes becomes high, and accordingly, the concentration of the solution at the heat-transfer surface becomes locally higher so as to corrode and deteriorate the heat-transfer surface. Thus, since inexpensive materials cannot be used for the solution tubes, the high temperature regenerator is extremely expensive.

Further, the arrangement as proposed by the Japanese Laid-Open Patent No. H9-42800 in which dilute solution from the solution pump flows through the heat-transfer tube bank so as to effect forced convection, is not preferable since the circulation volume of the solution in the high temperature regenerator is, in general, throttled during partial load operation of an absorption refrigerating machine but the high temperature regenerator with the forced convection cannot be operated in a partial load condition.

Accordingly, the present invention is devised in view of the above-mentioned disadvantages caused by the above-mentioned prior art, and accordingly, one object of the present invention is to provide a high temperature regenerator for an absorption water cooling and heating machine, which can prevent the concentration of solution liquid from becoming locally higher at heat-transfer surfaces of the high temperature regenerator so as to be inexpensive and to have a long use life, and in which the circulation volume of the solution can be controlled during partial load operation so as to carry out energy saving operation, and to restrain the generation of thermal NOx, thereby it is possible to aim at lowering the emission of NOx.

DISCLOSURE OF THE INVENTION

In order to achieve the above-mentioned object, according to a first feature of the present invention, there is provided a high temperature regenerator for an absorption water cooling and heating machine, including a burner, a combustion chamber, a solution passage, a coolant vapor outlet passage, a gas exhaust passage, outer and inner casings between which liquid chambers for reserving dilute solution are defined, the combustion chamber being incorporated in the inner casing so as to heat the solution in order to condense the solution for extracting coolant vapors from the solution, a plurality of solution tubes provided in the combustion chamber, communicated with liquid chambers located above and below the inner casing and having a sectional shape which is thin ovoid in the flowing direction of combustion gas, wherein flame from the burner impinges upon the plane solution tubes.

According to a second feature of the present invention in order to achieve the above-mentioned object, there is provided a high temperature regenerator for an absorption water cooling and heating machine, including a burner, a combustion chamber, a solution passage, a coolant vapor outlet passage, a gas exhaust passage, outer and inner casings between which liquid chambers for reserving dilute solution are defined, the combustion chamber being incorporated in the inner casing so as to heat the solution in order to condense the solution for extracting coolant vapors from the solution, a circulation volume control means for the solution in the high temperature regenerator, a combustion control means, a heat-exchanging means for carrying out heat-exchange between the combustion gas and the solution, and a gas-liquid separating means, the heat-exchanging means being composed of a first bank of plane tubes which are located in the vicinity of the burner and which are planer along the flowing direction of the combustion gas, and a second bank of plane tubes which are located in the vicinity of the combustion gas exhaust passage and which are planer along the flowing direction of the combustion gas. In the first tube bank, the solution tubes are plane tubes having a cross-sectional shape which is planar in the flowing direction of the combustion gas with no heat transfer fins being provided outside of the solution tubes, and in the second tube bank, the solution tubes are plane tubes having a cross-sectional shape which is thin-ovoid along the flowing direction of combustion gas with a larger number of heat transfer fins provided outside of the solution tubes on the downstream side of the combustion gas, but with a small number of heat transfer fins or with no heat transfer fins provided outside of the solution tubes on the downstream side of the combustion gas.

According to a third feature of the present invention in order to achieve the above-mentioned object, there is provided a high temperature regenerator for an absorption water cooling and heating machine, including a burner, a combustion chamber, a solution passage, a coolant outlet passage, a gas exhaust passage, outer and inner casings between which liquid chambers for reserving dilute solution is defined, the combustion chamber being incorporated in the inner casing so as to heat the solution in order to condense the solution for extracting coolant vapors from the solution, plane solution tubes communicated with liquid chambers located above and below the inner casing, arranged on the downstream side of the combustion chamber so as to cross the combustion gas and having a cross-sectional shape which is thin ovoid, heat transfer fins provided by a large number outside of the solution tubes on the upstream side of the combustion gas, but provided by a small number or not at all outside of the solution tubes on the downstream side of the combustion gas.

According to a fourth feature of the present invention in order to achieve the above-mentioned object, there is provided a high temperature regenerator for an absorption water cooling and heating machine, including a burner, a combustion chamber, a solution passage, a coolant discharge passage, a gas exhaust passage, outer and inner casings between which liquid chambers for reserving dilute solution are defined, the combustion chamber being incorporated in the inner casing so as to heat the solution in order to condense the solution for extracting coolant vapors from the solution, flue tubes connected to the outer wall surface of the combustion chamber on the downstream side, and having a sectional shape which is long perpendicular to the flowing direction of the combustion gas, and in the vertical direction, and heat transfer fins provided in the flue tubes by a large number on the upstream side of the combustion gas but provided in the flue tubes by a small number or not at all on the downstream side of the combustion gas.

BEST MODES FOR CARRYING OUT THE INVENTION

At first, explanation will be made of the principle under which the present invention is devised, with reference to FIGS. 18 to 20.

Figure 18:
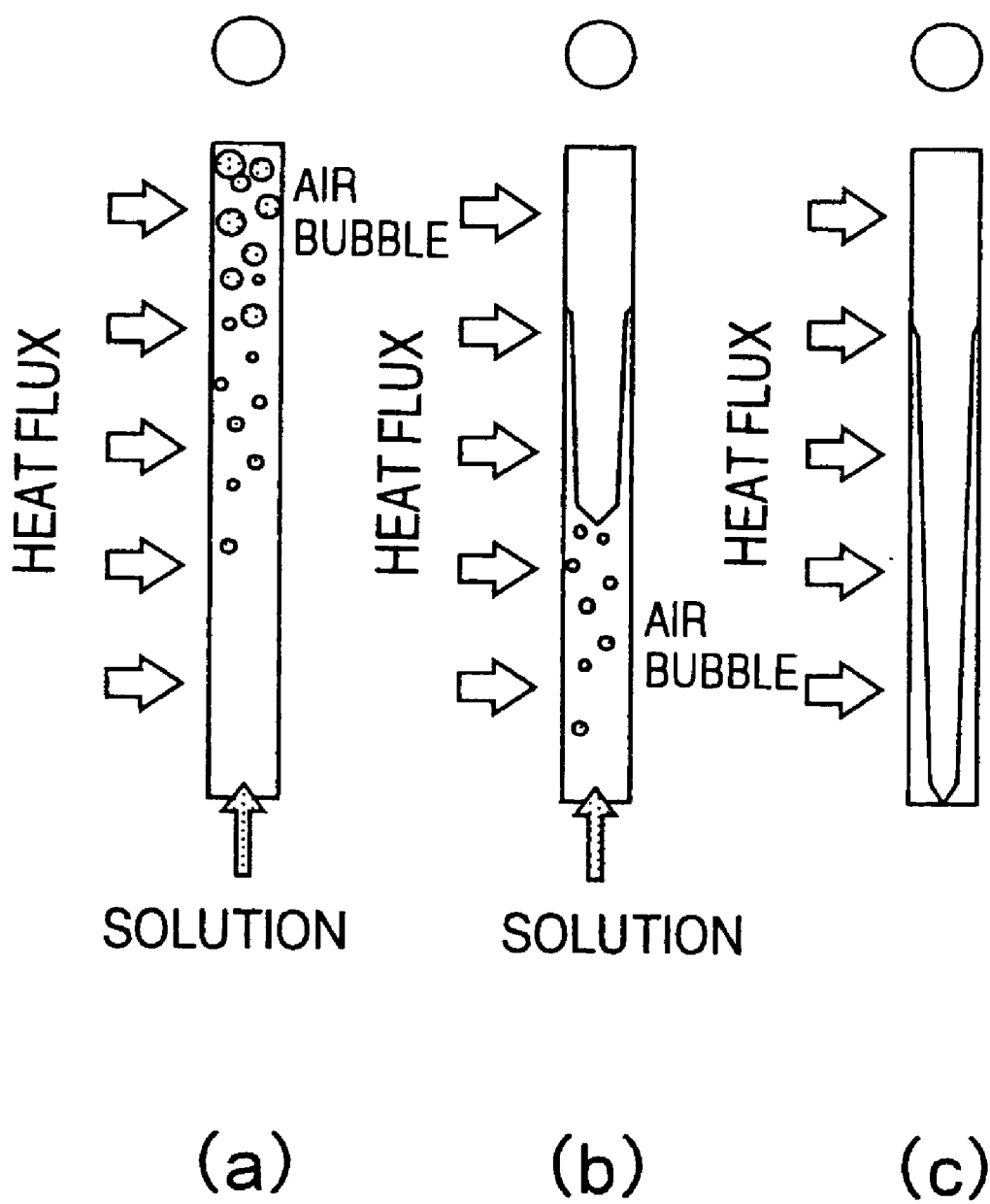
FIG. 18 is a view for explaining the flow of solution in a tube having a circular cross-sectional shape in a high temperature regenerator.

FIG. 18 is a view for explaining the flow of solution in a solution tube having a circular cross-sectional shape; FIG. 19 is a view for explaining the flow of solution in a plane solution tube having a thin ovoid sectional shape; FIG. 20 is a view for explaining the flow of solution in the plane solution tube, being based upon visualizing experiments. In FIGS. 18 and 19, horizontal bold arrows indicate heat fluxes, and hatched arrows indicate flows of solution.

FIG. 18 shows a state of boiling in the case of the solution tube having a circular cross-sectional shape. Air bubbles are generated in the solution in the tube by a heat flux when a burner is heated so as to start boiling as indicated by (a) in FIG. 18; In the case of the solution tube having a circular cross-sectional shape, the flow of the solution occurs only in the vertical direction, and accordingly, it can be said that a one-dimensional flow is obtained. Thus, if the heat flux to the solution pipe becomes excessively high, the volume of generated vapors becomes larger so that the concentration of the solution becomes higher as shown in FIG. 18(b), and accordingly, the crystallization occurs in the solution so as to cause empty heating as shown by (c) in FIG. 18. Thus, there would be a risk of occurrence of corrosion at a heat-transfer surface.

Figure 19:
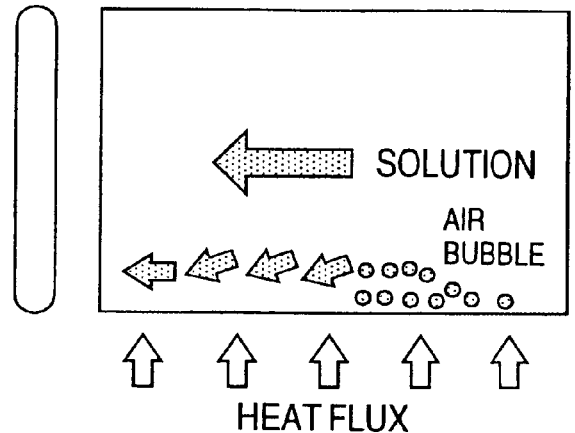
FIG. 19 is a view for illustrating the flow of solution in a thin ovoid sectional shape.
Figure 19:
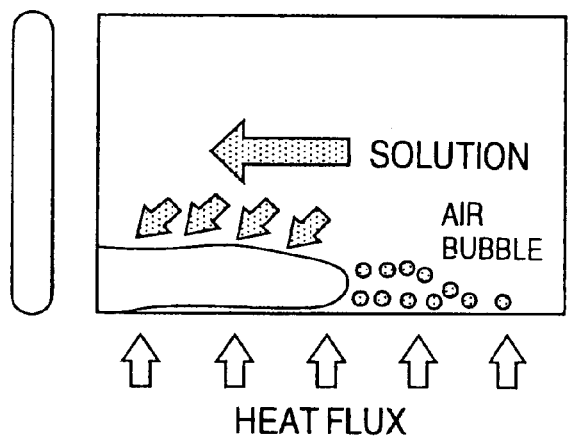
Figure 19:
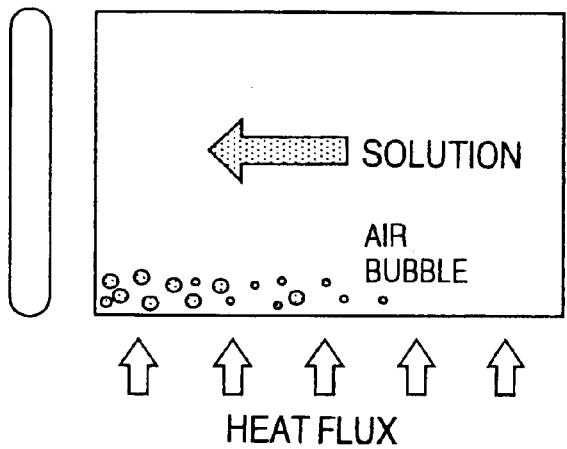

FIG. 19 shows a state of boiling in the case of a solution tube having a thin ovoid sectional shape. Boiling of solution in the tube is started by a heat flux as indicated by (a) in FIG. 19. In the case of a solution tube having a thin ovoid sectional shape, flows of the solution are created upward and downward, and leftward and rightward, and accordingly, it can be said that a two-dimensional flow is obtained. Thus, if the heat-flux to the solution pipe becomes excessively higher so as to increase the volume of generated vapors, the concentration of the solution tends to become higher as indicated by (b) in FIG. 19, that is, an empty heating condition tends to occur. Even in this condition, flows are created in right and leftward directions in which the concentration of the solution is laterally lowered as indicated by (b) and (c) in FIG. 19, and accordingly, the solution is never crystallized while a heat transfer surface is never corroded. Further, due to the two-dimensional flow, there is presented such an advantage that the flowing ability is satisfactorily high.

Figure 20:
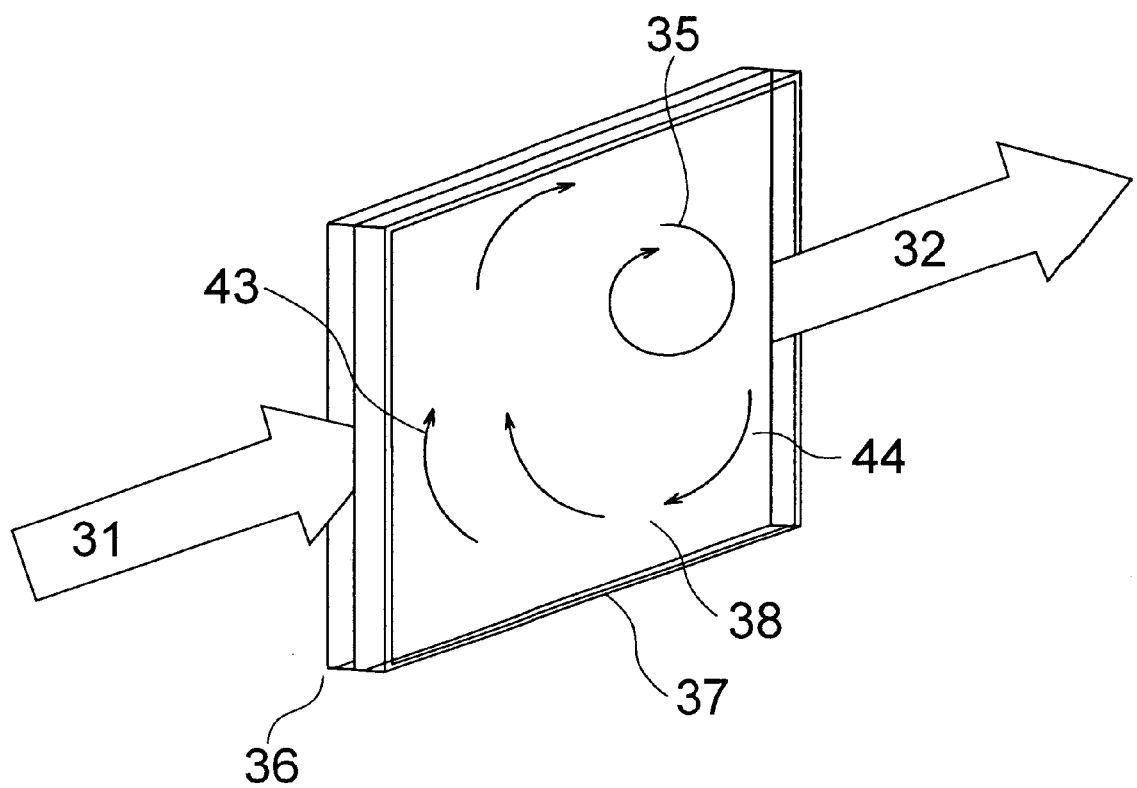
FIG. 20 is a view illustrating the flow of solution in a plane passage.

FIG. 20 shows results of observation during experiments for simulating the flow of solution in a plane passage. In these experiments, a glass pane 37 was attached to a front surface of a heat-exchange tube 36, and then a heat transfer surface 38 was heated by combustion gas. Then, the flow of the solution was observed as indicated by arrows depicted by solid lines. Since the heat flux of the heat transfer surface is high on the combustion gas inlet side 31 while the heat flux of the heating surface is adjusted to be low on the combustion gas outlet side 32, the volume of generated vapors is larger on the combustion gas inlet side. As a result, the solution filled in the plane passage creates a boiling ascent flow 43 on the combustion gas inlet side, but creates a descent flow 44 on the combustion gas outlet side, and accordingly, as a whole, a spiral flow 35 is obtained as shown in FIG. 20. Thus, the stagnation of the solution can be prevented while the ascending flow rate can be increased in a high heat flux range, thereby it is possible to enhance the coefficient of heat transfer for boiling in the combustion gas inlet side. That is, the solution is satisfactorily circulated in the plane passage as a whole.

In comparison with the solution tube having a circular cross-sectional shape as disclosed in the Japanese Laid-Open Patent No. H8-193767 and in the Japanese Laid-Open Patent No. H9-42800, so as to create the flow of solution shown in FIG. 18, the solution tube, according to the present invention, has a thin ovoid sectional shape so as to obtain the flow of the solution shown in FIGS. 19 and 20. Further, according to the present invention, a large number of heat transfer fins are provided to the solution tube having a thin ovoid sectional shape on the upstream side of the combustion gas, but a small number of heat transfer fins or no heat transfer fins are provided to the same on the downstream side of the combustion gas. With this arrangement, the flow of solution shown in FIG. 20 is promoted, and accordingly, the spiral flow is created in the solution tube, thereby it is possible to prevent occurrence of stagnation of the solution, and to lessen corrosion and deterioration at a heat transfer surface on the solution side.

Figure 1:
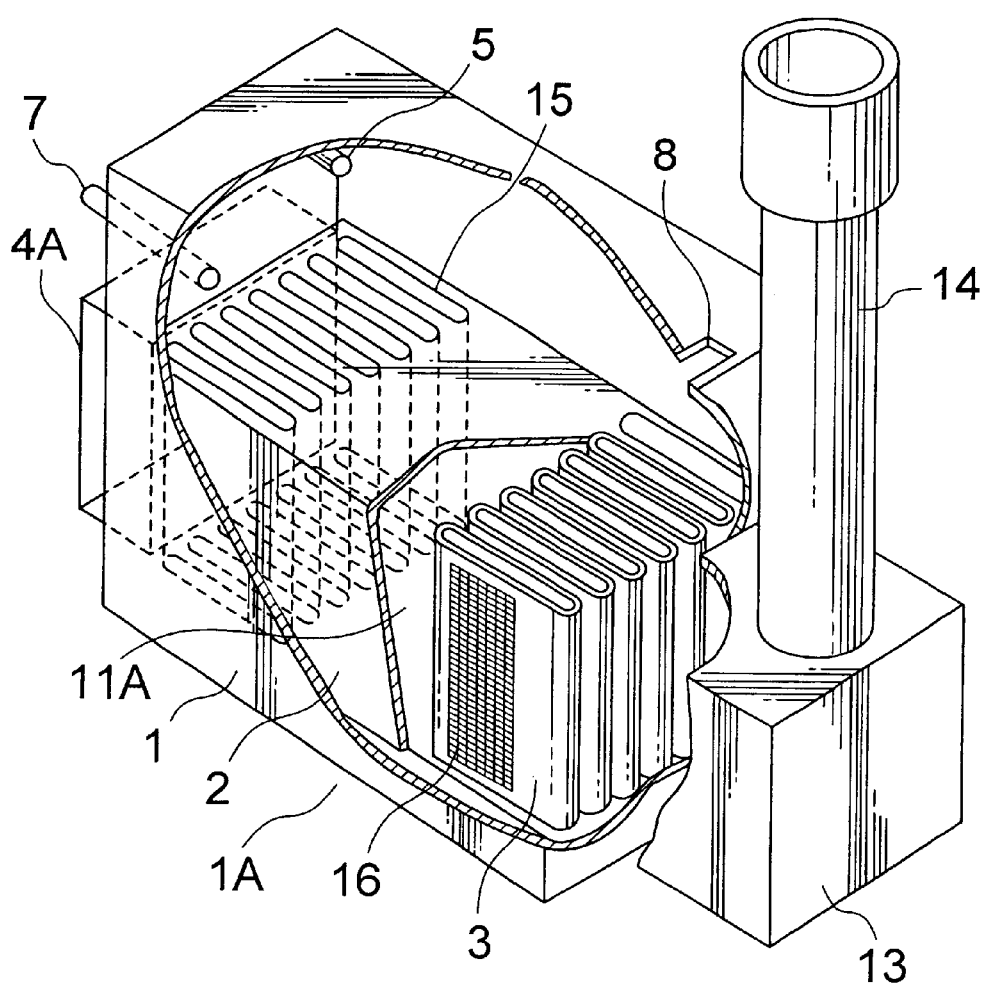
FIG. 1 is a partly sectioned perspective view illustrating a first embodiment of a high temperature regenerator according to the present invention.
Figure 2:
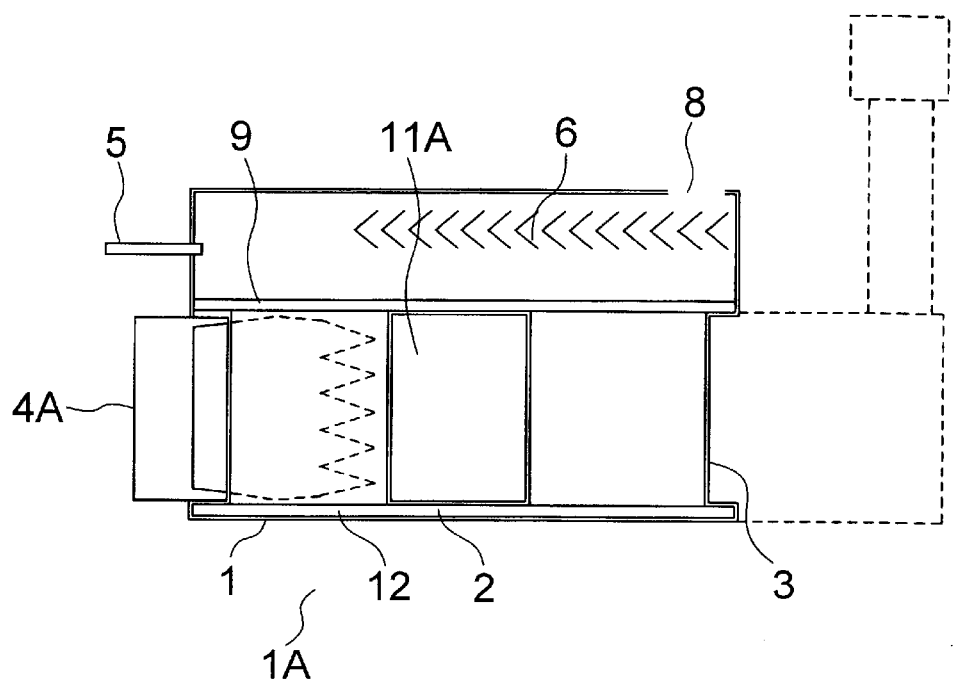
FIG. 2 is a longitudinal section view illustrating the high temperature regenerator shown in FIG. 1.
Figure 3:
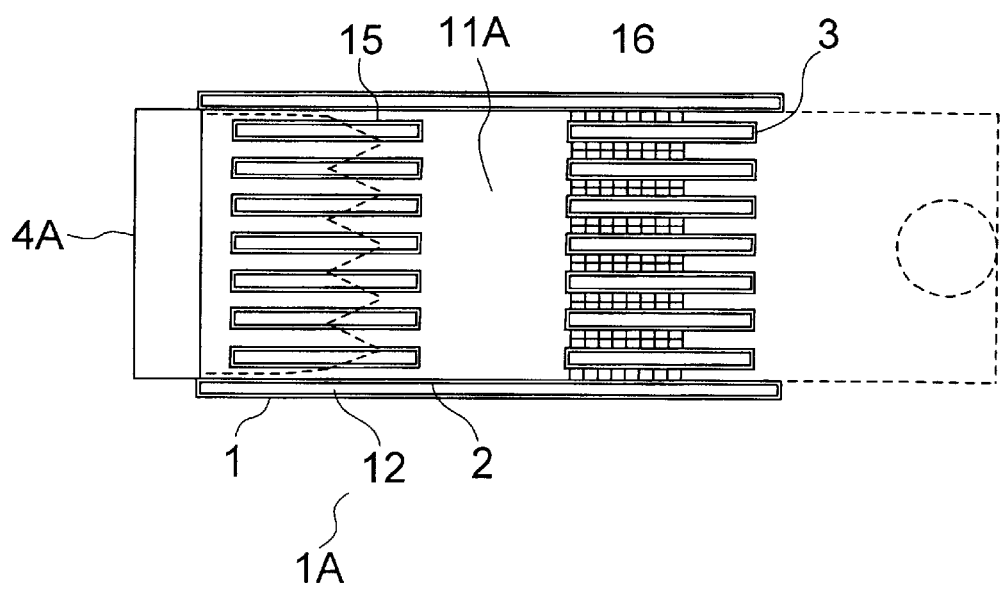
FIG. 3 is a cross-sectional view illustrating the high temperature regenerator shown in FIG. 1.

Explanation will be hereinbelow made of specific embodiments of the present invention with reference to FIGS. 1 to 17. FIGS. 1 to 3 shows a first embodiment of the present invention, that is, FIG. 1 is a partly sectioned perspective view illustrating a high temperature regenerator, FIG. 2 is a longitudinal sectional view illustrating the high temperature regenerator shown in FIG. 1, and FIG. 3 is a cross-sectional view illustrating the high temperature regenerator shown in FIG. 1.

Referring to these figures, there are shown an outer casing 1, an inner casing 2, solution tubes provided in the inner casing 2 on the funnel box side and having a planar sectional shape, and a burner 4A such as a ceramic burner in a form of a combustion burner for uniformly blowing a large number of flames from the front surface of the burner as indicted by broken lines shown in FIG. 2. Further, there are shown a solution inlet pipe for introducing dilute liquid into a space zone in the upper part of a liquid chamber, a mist separator 6 relating to a gas-liquid separating means provided in the space zone in the upper liquid chamber, a solution outlet hole 7 for discharging high concentration solution, a coolant vapor outlet hole 8 formed in the upper part of the outer casing 1, solution 9, a combustion chamber 11A provided in the inner cylinder 2, a funnel box 13, a smoke stack 14 and solution tubes 15 having a thin ovoid sectional shape provided in the inner casing 2 on the burner 4A side.

The high temperature regenerator 1A which is internally and externally shown in FIG. 1, is composed of the outer casing 1, the inner casing 2, a plurality of solution tubes 3, 15, the burner 4A, the solution inlet pipe 5, the mist separator 6 and the like. The outer casing 1 and the inner casing 2 located in the outer casing 1 holds the solution 9 therebetween, and the inner casing 2 is submerged in the liquid 9. The burner 4A is attached to the outer surface of the outer casing 2, extending through the inner casing 2. The inner casing 2 defines the combustion chamber 11A. The above-mentioned liquid chamber is therein defined between the outer casing 1 and the inner casing 1. A plurality of first solution tubes 15 and a plurality of second solution tubes 3 which are communicated respectively with liquid chambers 12 above and below the inner casing 2, are provided respectively on the upstream side and the downstream side of the combustion chambers 11A, and the solution tubes 15, 3 are filled therein with the solution 9.

The first solution tubes 15 on the burner 4A side, and the second solution tube 3 on the funnel box 13 side both have a thin-ovoid sectional shape along combustion gas passages, they being arranged in one row in which the planer straight parts of the tubes are arranged in parallel with one another. Combustion gas passages are defined among the plurality of solution tubes 15 and among the plurality of solution tubes 3.

No heat transfer fins are formed on the outer surfaces of the solution pipes 15 upstream side of the combustion gas. Meanwhile, fins 16 are formed on the outer surface, on the upstream side of the combustion gas, of the solution tubes 3 located on the downstream side of the combustion gas. There are presented a large number of fins 16 on the solution tubes 3 on the upstream side of the combustion gas (the burner 4a side), but a small number of fines 16 are formed thereon on the downstream side of the combustion gas (funnel box 13 side).

Further, the solution inlet pipe 5 and the mist separator 6 are laid above the solution 9 within the outer casing 1, the solution outlet hole 7 is formed in a side surface of the outer casing 7 while the coolant vapor outlet hole 8 is formed in the top surface thereof.

Flames from the burner 4A run through passages defined between planar planes (planar straight parts) of adjacent neighbor solution pipes 15, and accordingly, they are cooled while it moderately burns. Accordingly, the solution 9 in the solution tubes 15 is heated through radiation and convection heat-transfer. Thereafter, it passes through passages defined between planer surfaces (planer straight line parts) of the plurality of adjacent solution tubes 3. Accordingly, the solution in the solution tubes 3 is heated through convection heat transfer before it flows into the funnel box 13. Thus, it is exhausted into the outside through the smoke stack 14 connected to the upper part of the funnel box 13.

The solution 9 which has been heated is boiled so as to generate coolant vapors which ascend in the form of an rise-up flow through the solution tubes 15 and the solution tubes 3, and ascends passages between the outer casing 1 and the inner casing 2. Then, it comes up on the liquid surface and runs through the mist-separator 6, and thereafter, it runs into a coolant pipe line (which is not shown) through the coolant vapor outlet pipe 5. Meanwhile, the dilute solution is led into the high temperature regenerator 1A through the solution tubes 15 where it is then heated and boiled so as to be turned into a concentrated solution having a high concentration, which is then led from the solution outlet pipe 7 into a solution pipe line (which is not shown).

As mentioned above, according to the present invention, the temperature of the combustion gas exceeds 1,000 deg. C. in the solution tubes 15 on the upstream side of the above-mentioned combustion gas, and the heat flux in the solution tubes 15 is high on the burner 4A side while the heat flux in the solution tubes 15 on the smoke stack is low. Further, the temperature of the combustion gas in the solution tubes 3 on the downstream side of the combustion gas is below 1,000 deg. C. so that a large number of the fines are provided on the outer surfaces of the solution tubes 3 on the combustion gas side so as to increase the area of the heat transfer surface on the gas side. Accordingly, the heat flux of the solution tubes on the burner side becomes higher. Meanwhile, a small number of fines, or no fins are provided to the combustion gas side outer surfaces of the solution tubes 3 on the smoke stack side so as to decrease the heat transfer surface, and accordingly, in addition to the lowering of the temperature of the combustion gas, the heat flux of the solution tubes 3 is low on the smoke stack side.

As a result, either of the solution in the solution tube 15 and the solution tubes 3 creates a rise-up flow on the burner 4A side, and a fall-down flow on the smoke stack 14 side, and accordingly, these flows of the solution creates spiral flow. Thus, the stagnation of the solution can be prevented so that the rise-up flow in the high flux zone can be increased, and accordingly, the boiling heat transfer coefficient can be enhanced in the combustion gas inlet part, thereby it is possible to restrain the solution tubes from being corroded and deteriorated.

Figure 4:
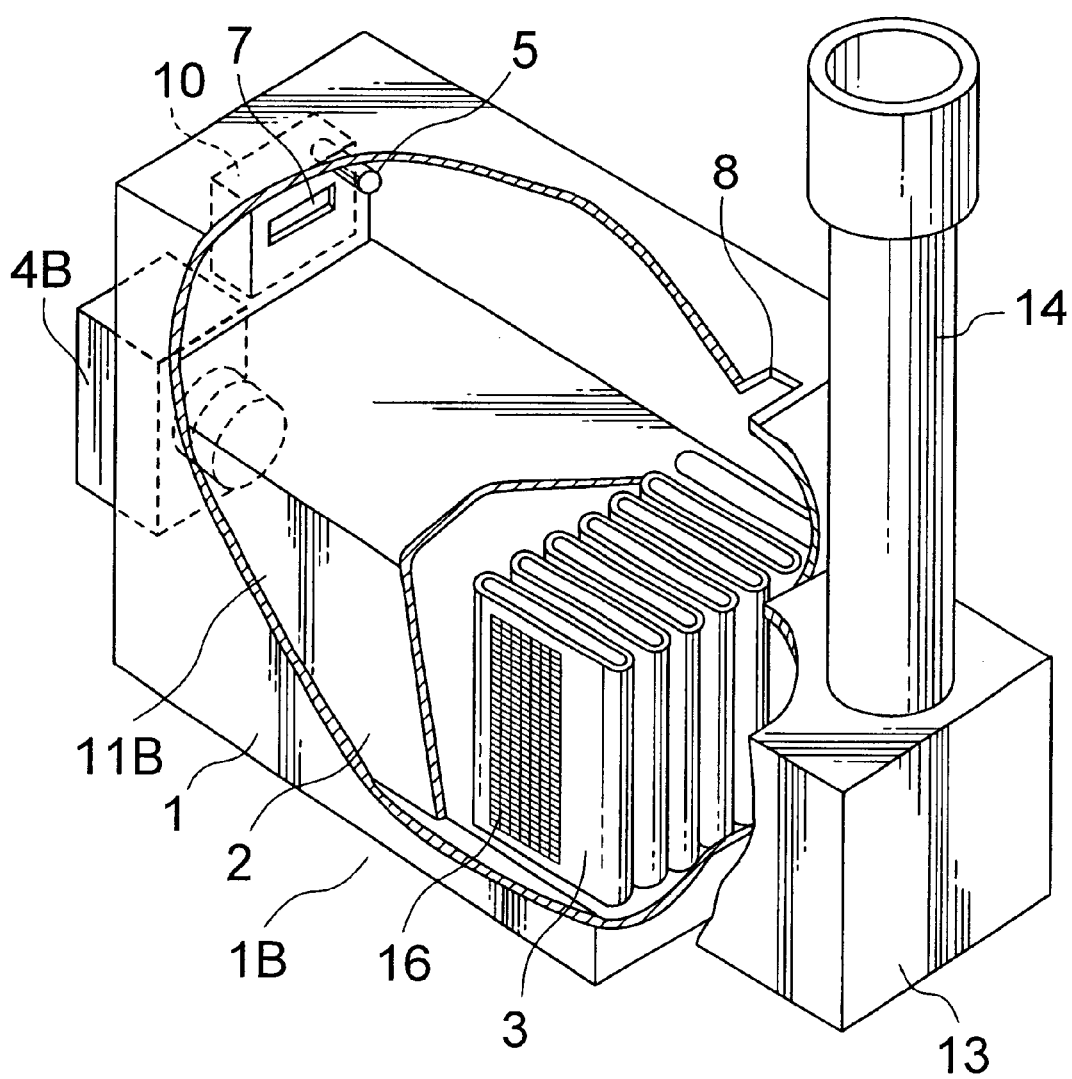
FIG. 4 is a partly sectioned perspective view illustrating a second embodiment of a high temperature regenerator according to the present invention.
Figure 5:
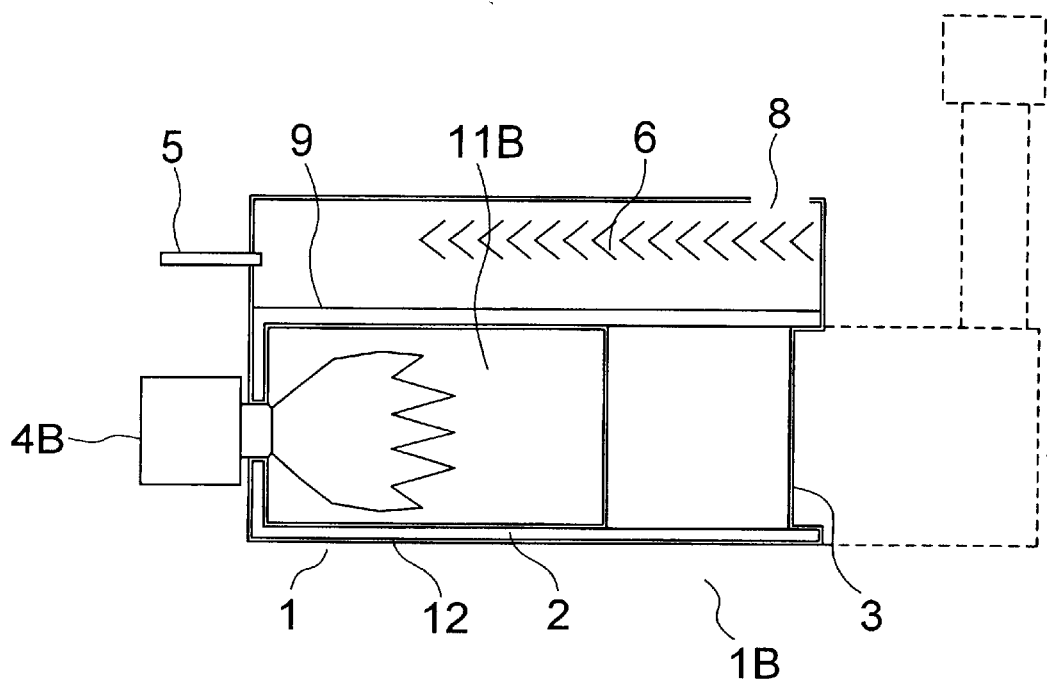
FIG. 5 is a longitudinal sectional view illustrating the high temperature regenerator shown in FIG. 4.
Figure 6:
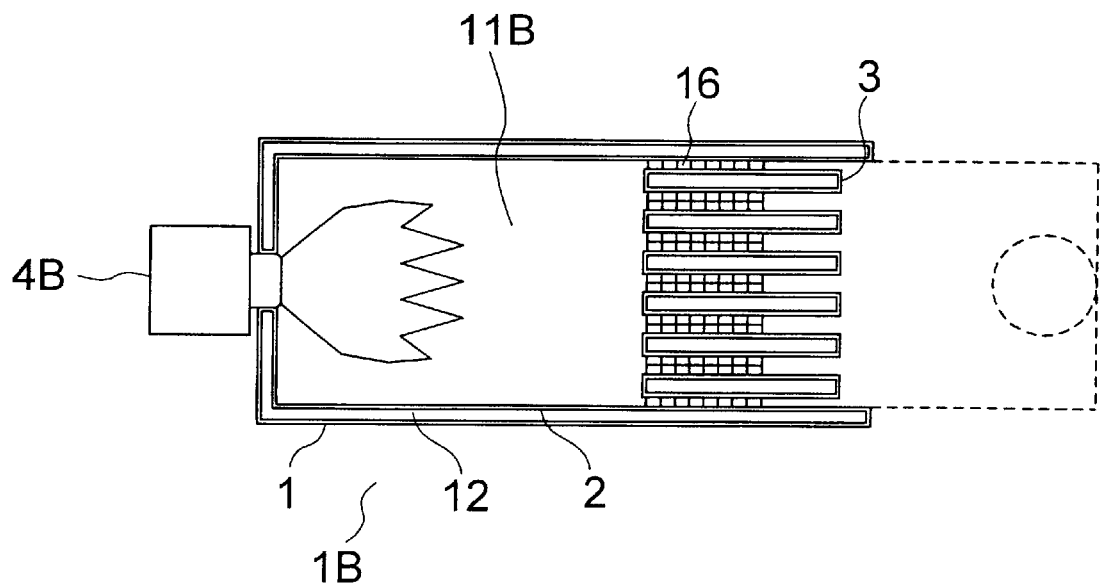
FIG. 6 is a cross-sectional view illustrating the high temperature regenerator shown in FIG. 4.

Next, explanation will be made of a second embodiment of the present invention with reference to FIGS. 4 to 6. FIG. 4 is a partly sectioned perspective view illustrating a high temperature regenerator, FIG. 5 is a longitudinal sectional view illustrating the high temperature regenerator shown in FIG. 4, and FIG. 6 is a cross-sectional view illustrating the high temperature regenerator shown in FIG. 4. In these figures, like reference numerals are used to denote like parts to those shown in FIGS. 1 to 3.

The high temperature regenerator 1B is composed of an outer casing 1 and an inner casing 2, a plurality of solution tubes 3, a burner 4B, a solution inlet pipe 5 and a mist-separator 6. The outer casing 1 and the inner casing 2 located in the outer casing 1 hold solution 9 therebetween, and the inner casing 2 is submerged in the solution 9. The burner 4B which is of a gun type as shown in FIG. 4, is extended through the inner casing 2 and is attached to the outer surface of the outer casing 1, and the inner casing 2 defines therein a combustion chamber 11B. Liquid chambers 12 are defined between the outer casing 1 and the second casing 2, and a plurality of solution tubes 3 communicated with the liquid chambers 12 above and below the inner casing 2 are laid in the combustion chamber 11B on the downstream thereof, and are filled therein with the solution 9.

The solution tubes 3 have a thin ovoid sectional shape along the combustion gas passage, and arranged in one row in which planar straight line parts of them are parallel with one another. Combustion gas passages are defined between the adjacent solution tubes, and fines 16 are formed on the outer surfaces of the solution tubes 3 on the combustion gas side. The number of the fins 16 is larger on the burner side of the solution tubes 3 than that on the smoke stack side. Further, the solution inlet pipe 5 and the mist-separator 6 are laid in the outer casing 1 above the solution 9. A solution outlet hole 7 is formed in one side surface of the outer casing 1, and a coolant vapor outlet hole 8 is formed in the top surface of the outer casing 1.

There is shown a float box 10 which is communicated with the outer casing 1 through the intermediary of the solution outlet hole 7, and the solution inlet pipe 5 is extended through the float box 10, and is communicated with the outer casing 1. A float valve (which is not shown) is provided in the solution inlet pipe 5 within the float box 10, and accordingly, the flow rate of the solution fed into the high temperature regenerator 1B is adjusted in accordance with the level of the solution in the float box 10.

Combustion gas from the burner 4B heats the solution mainly by radiant heat transfer through the wall surfaces of the inner casing 2, and then, runs through passages defined by the planer surfaces of the adjacent solution tubes 3 while it heats the solution 9 in the solution tubes 3 by convection heat transfer before it flows into a funnel box 13. Then, the combustion gas is exhausted into the outside through a smoke stack 14 connected to the upper part of the funnel box 13.

The heated solution 9 is boiled so as to generate coolant vapors which ascends in the form of a rise-up flow through the solution tubes 3 and passages between the outer casing 1 and the inner casing 2, and which then comes up above the liquid surface, and is vented from the coolant vapor outlet hole 8 through the mist-separator 6. Meanwhile, the dilute solution is led through the solution inlet pipe 5 and into the high temperature regenerator 1B in which it is heated and boiled, and the solution having a high concentration is led into the float box 10 from the solution outlet hole 7. The solution is once reserved in the float box 10 so as to form a liquid surface, and then flows into a solution pipe line (which is not shown).

As mentioned above, according to this embodiment, since a large number of the fins 16 are formed on the outer surfaces, on the combustion gas side, of the solution tubes 3 on the burner 4b side, the heat flux of the solution tubes 3 on the burner 4B side is high, but since no fins 6 are formed on the outer surface, on the combustion gas side, of the solution tube on the smoke stack 14 side, the heat flux of the solution tubes 13 on the smoke stack 14 side is low. As a result, the solution in the solution tubes 3 creates a rise-up flow on the burner 4B side but creates a fall-down flow on the smoke stack 14 side so that the liquid flow exhibits a spiral flow. Thus, the stagnation of the solution can be prevented, and the ascending flow speed can be increased in the high heat flux zone. Accordingly, the boiling heat transfer coefficient can be enhanced in the combustion gas inlet part, thereby it is possible to lessen corrosion and deterioration of the liquid solution tubes 3.

Next, explanation will be made of a variant form of the above-mentioned embodiment with reference to FIGS. 7 and 8.

Figure 7:
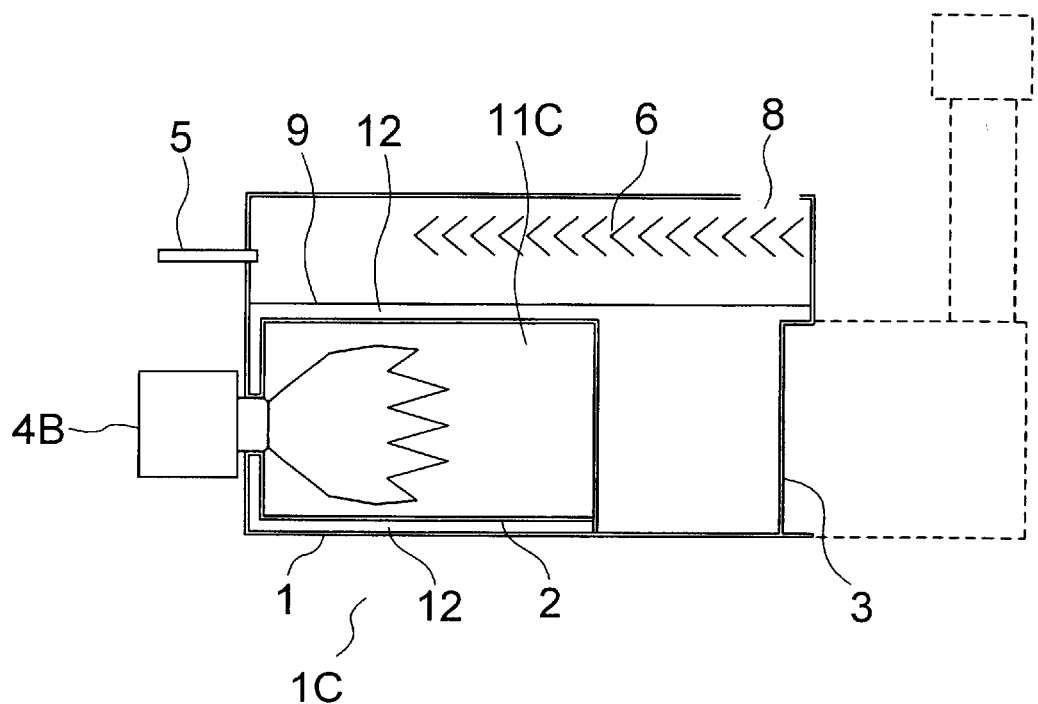
FIG. 7 is a longitudinal view illustrating a variant form of the second embodiment of the high temperature regenerator.
Figure 8:
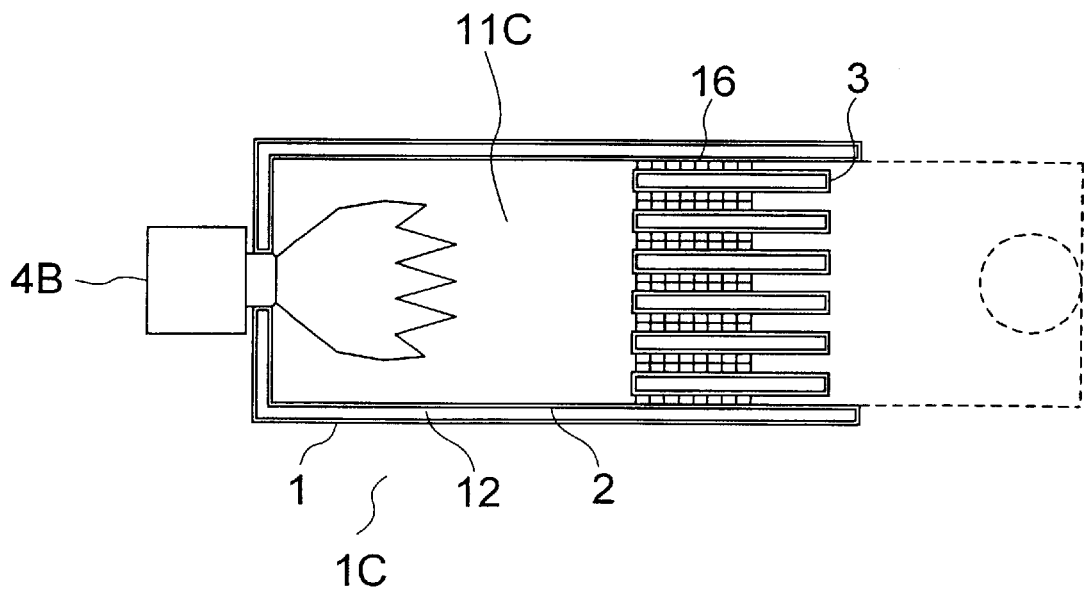
FIG. 8 is a cross-sectional view illustrating the high temperature regenerator shown in FIG. 7.

FIG. 7 is a longitudinal sectional view illustrating a high temperature regenerator, and FIG. 8 is a cross-sectional view illustrating the high temperature regenerator shown in FIG. 7. In these figures, like reference numerals are used to denote like parts to those shown in FIGS. 5 and 6.

The high temperature regenerator 1C is composed of an outer casing 1 and an inner casing 2, a plurality of solution tubes 3, a burner 4B, a solution inlet pipe 5 and a mist separator 6. The outer casing 1 and the inner casing 2 which is located in the outer casing 1 hold solution 9 therebetween, and the inner casing 2 is submerged in the solution 9. The burner 4B is extended through the inner casing 2 and is attached to the outer surface of the outer casing 1, and the inner casing 2 defines therein a combustion chamber 11C. Liquid chambers 12 are defined between the outer casing 1 and the inner casing 2, and the plurality of solution tubes 3 which are communicated at their upper ends with the liquid chamber 12 above the inner casing 2, are laid in the combustion chamber 11C on the downstream side thereof, and are filled therein with the solution 9.

The lower ends of the solution tubes 3 are connected to the outer casing 1 so that the solution 9 cannot flows into the solution tubes 3 from the lower ends thereof. The solution tubes 3 have a thin ovoid sectional shape along combustion gas passages, and are arranged in one row in planar straight line parts of them are arranged in parallel with one another. The combustion gas passages defined between the adjacent solution tubes 3, and fins 16 are formed on the outer surfaces, on the combustion gas side, of the solution tubes 3. The number of the fins 16 of the solution tubes 3 is larger on the burner 4B side than that on the smoke stack 14 side.

As mentioned above, according to this embodiment, since a large number of the fins 16 are formed on the outer surfaces, on the combustion gas side, of the solution tubes 3 on the burner 4B side, the heat flux of the solution tubes 3 on the burner 4B side is high, but since no fins 6 are formed on the outer surface, on the combustion gas side, of the solution tubes 3 on the smoke stack 14 side, the heat flux of the solution tubes 3 on the smoke stack 14 side is low. As a result, the solution in the solution tubes 3 creates a rise-up flow on the burner 4B side but creates a fall-down flow on the smoke stack 14 side so that the liquid flow exhibits a spiral flow. Thus, the stagnation of the solution can be prevented, and the ascending flow speed can be increased in the high heat flux zone. Accordingly, the boiling heat transfer coefficient can be enhanced in the combustion gas inlet part, thereby it is possible to lessen corrosion and deterioration of the liquid solution tubes 3. Further, no liquid chamber 12 is present below the solution tubes 3, it is possible to aim at making the high temperature regenerator 1C small-sized. Thereby it is possible to save resources.

Figure 9:
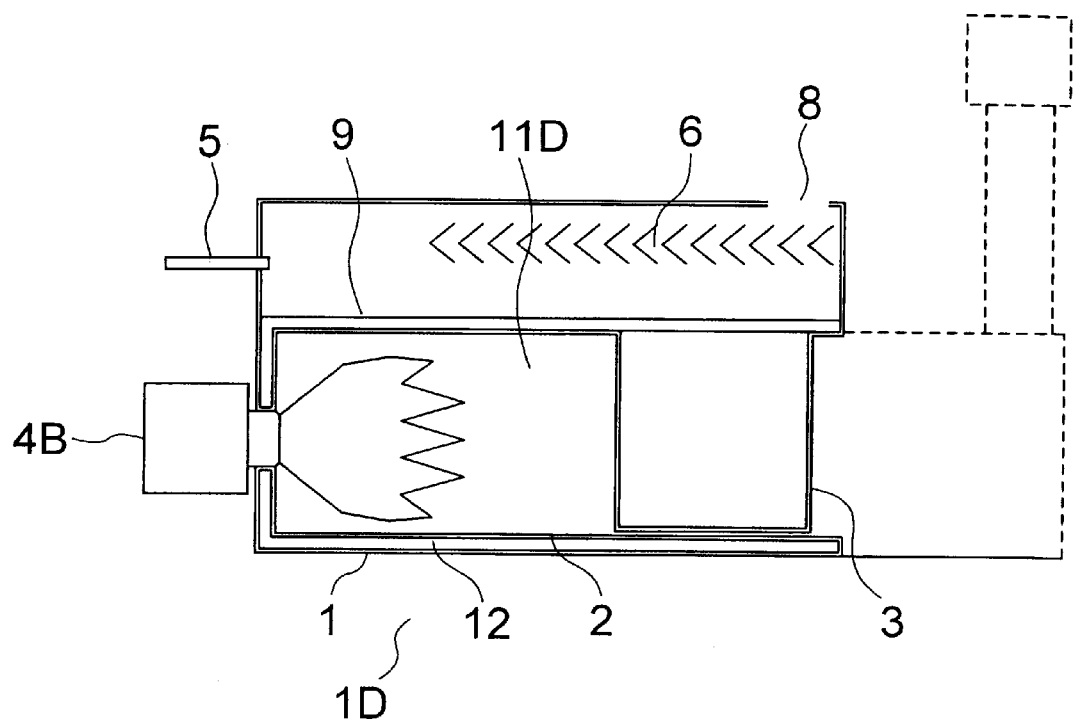
FIG. 9 is a longitudinal sectional view illustrating another variant form of the second embodiment of the high temperature regenerator.
Figure 10:
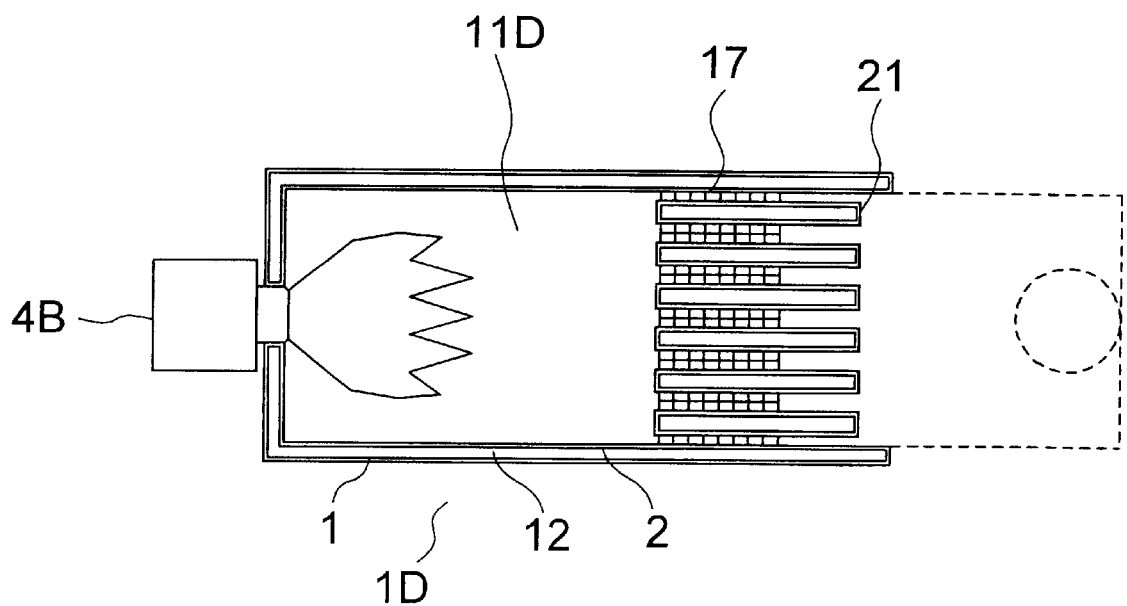
FIG. 10 is a cross-sectional view illustrating the high temperature regenerator shown in FIG. 9.

Next, explanation will be made of a further variant form of the above-mentioned second embodiment with reference to FIGS. 9 and 10. FIG. 9 is a longitudinal sectional view illustrating a high temperature regenerator, and FIG. 10 is a cross-sectional view illustrating the high temperature regenerator shown in FIG. 9. In these figures, like reference numerals are used to denote like parts to those shown in FIGS. 5 and 6.

The high temperature regenerator 1D is composed of an outer casing 1 and an inner casing 2, a plurality of bag-like heat-exchangers 21, a burner 4B, a solution inlet pipe 5 and a mist separator 6. The outer casing 1 and the inner casing 2 which is located in the outer casing 1 holds solution 9 therebetween, and the inner casing 2 is submerged in the solution 9. The burner 4B is extended through the inner casing 2 and is attached to the outer surface of the outer casing 1, and the inner casing 2 defines therein a combustion chamber 11D. Liquid chambers 12 are defined between the outer casing 1 and the inner casing 2, and the plurality of bag-like heatexchangers 21 which are communicated at their upper ends with the liquid chamber 12 above the inner casing 2, which are closed at their lower ends, and which are formed at their side surfaces with fins 17, are laid in the combustion chamber 11D on the downstream side thereof, and are filled therein with the solution 9.

The bag-like heat-exchangers 21 have a thin ovoid sectional shape along combustion gas passages, and are arranged in one row in which planar straight line parts of them are in parallel with one another. The combustion gas passages are defined between the adjacent bag-like heat-exchangers 21, and the fins 17 are formed on the outer surfaces, on the combustion gas side, of the bag-like heat-exchangers 21, the number of the fins 17 of the solution tubes 3 being larger on the burner 4 side than that on the smoke stack side.

According to this variant form of the second embodiment, since the bag-like heat-exchangers 21 may be welded to the top surface of the inner casing 2, thereby it is possible to shorten welding lines in comparison with the high temperature regenerator 1B shown in FIGS. 4 to 6, and the high temperature heat generator 1C shown in FIGS. 7 and 8.

Figure 11:
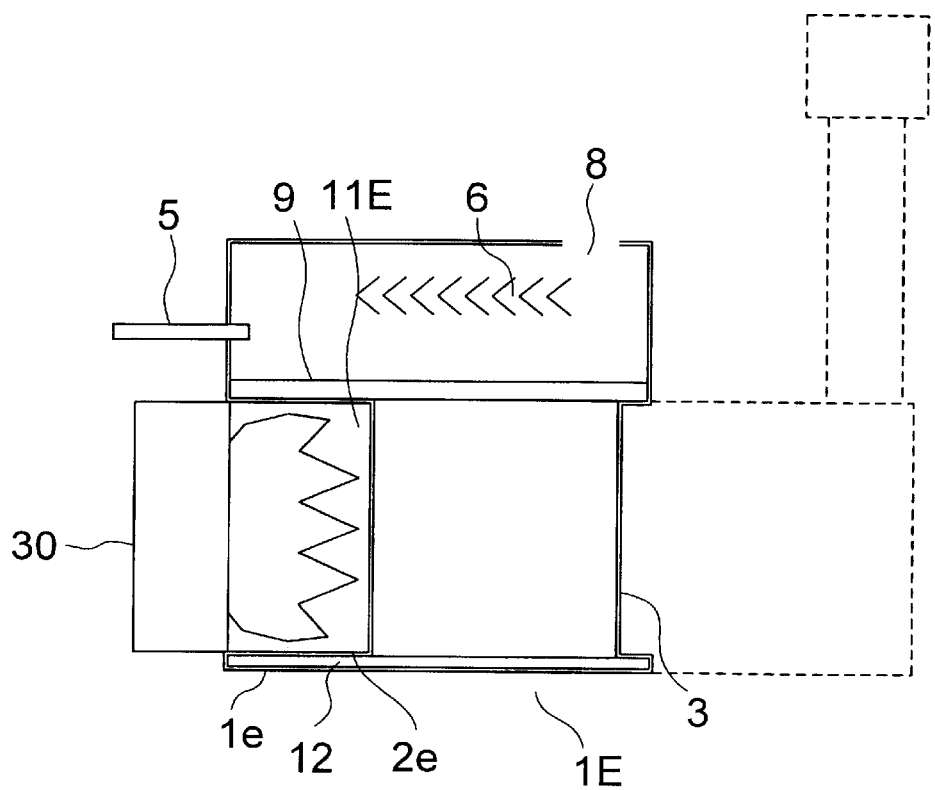
FIG. 11 is a longitudinal sectional view illustrating further another variant form of the second embodiment of the high temperature regenerator.
Figure 12:
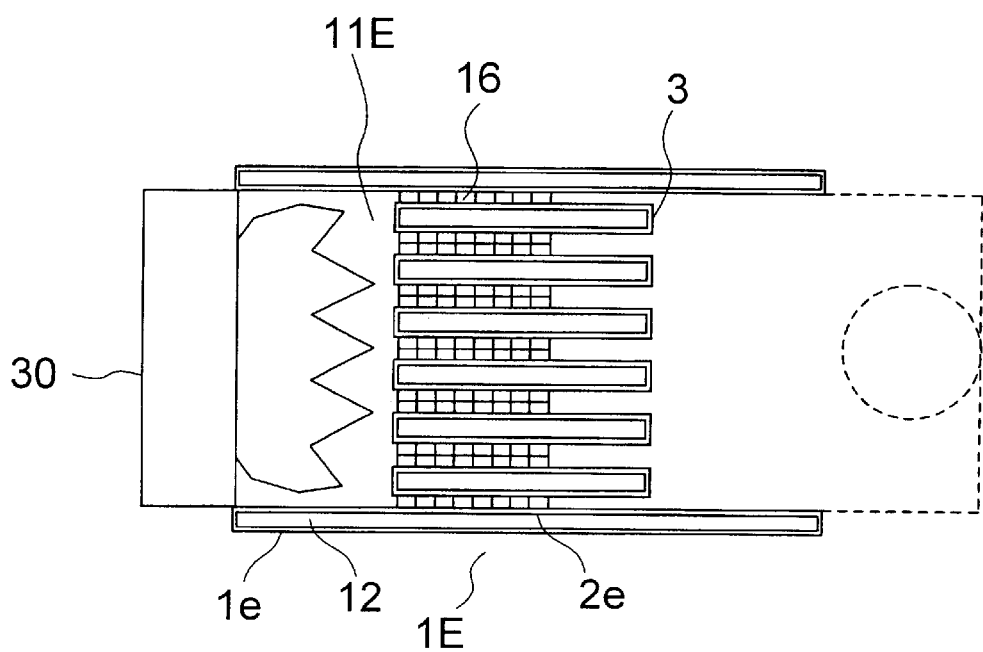
FIG. 12 is a cross-sectional view illustrating the high temperature regenerator shown in FIG. 11.

Next, explanation will be made of a further variant form of the above-mentioned embodiment with reference to FIGS. 11 and 12. FIG. 11 is a longitudinal sectional view illustrating a high temperature regenerator, and FIG. 8 i2 a cross-sectional view illustrating the high temperature regenerator shown in FIG. 7. In these figures, like reference numerals are used to denote like parts to those shown in FIGS. 5 and 6.

The high temperature regenerator 1E is composed of an outer casing 1e and an inner casing 2e, a plurality of solution tubes 3, a gas burner 30, a solution inlet pipe 5 and a mist separator 6. The gas burner 30 is of the type in which several flames are uniformly blows out from the front surface of the burner. The outer casing 1e and the inner casing 2e which is located in the outer casing 1e hold solution 9 therebetween, and the inner casing 2e is submerged in the solution 9. The gas burner 30 is attached to the outer surface of the inner casing, and the inner casing 2 defines therein a combustion chamber 11E. Liquid chambers 12 are defined between the outer casing 1e and the inner casing 2e, and the plurality of solution tubes 3 which are communicated with the liquid chamber 12 above and below the inner casing 22, are laid in the combustion chamber 11C on the downstream side thereof, and are filled therein with the solution 9.

The solution tubes 3 have a thin-ovoid sectional shape along combustion gas passages, and are arranged in one row in which their planar straight line parts are parallel with each other. The combustion gas passages are defined between the adjacent solution tubes 30, and fins 16 are formed on the outer surface, on the combustion gas side, of the solution tubes 30, the number of the fins 16 is larger on the gas burner 30 side of the solution tubes 3 than that on the smoke stack side thereof.

According to this variant form of the second embodiment, combustion can be made uniformly over a wide surface by short flames with the use of the gas burner 30, and accordingly, the combustion chamber 11E can be greatly small-sized. Thus, it is possible to aim at making the high temperature regenerator small-sized in comparison with the high temperature regenerators explained in the second embodiment and the variant forms thereof, thereby it is possible to same resources.

Figure 13:
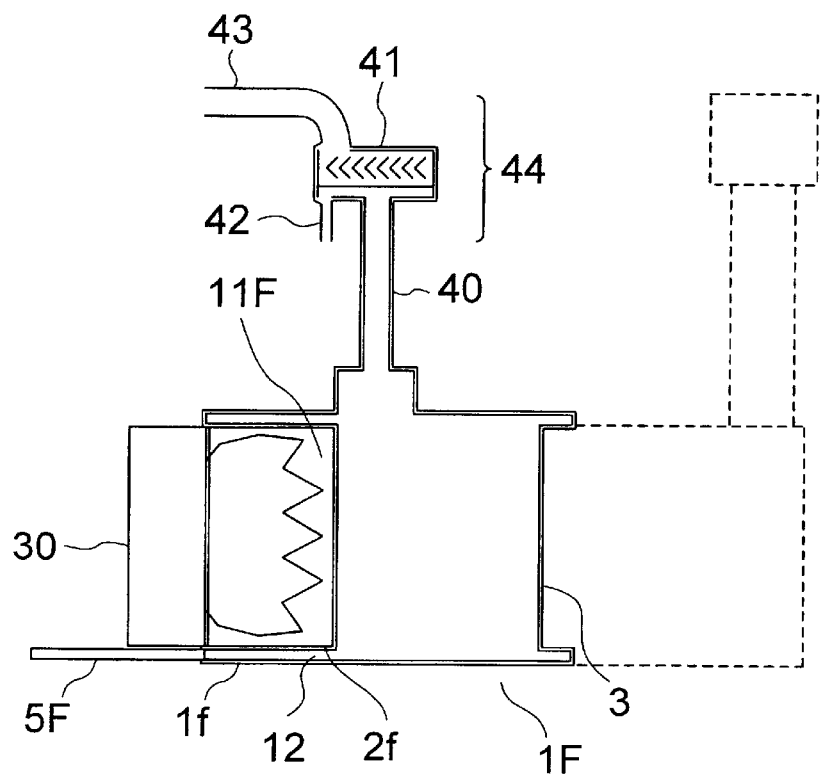
FIG. 13 is a longitudinal sectional view illustrating further another variant form of the second embodiment of the high temperature regenerator.
Figure 14:
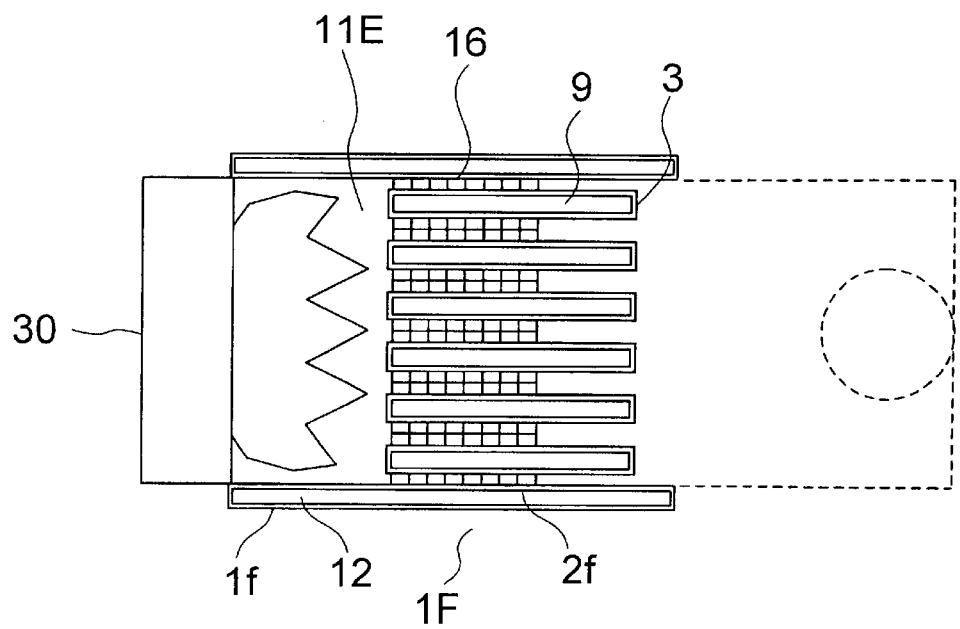
FIG. 14 is a cross-sectional view illustrating the high temperature regenerator shown in FIG. 13.

Next, explanation will be made of a variant form of the above-mentioned second embodiment with reference to FIGS. 13 and 14. FIG. 13 is a longitudinal sectional view illustrating a high temperature regenerator, and FIG. 14 is a cross-sectional view illustrating the high temperature regenerator shown in FIG. 13. The high temperature regenerator 1F is composed of an outer casing 1f and an inner casing 2f, a plurality of solution tubes 3, a gas burner 30, a solution inlet pipe 5 and a gas-liquid separator 44. The outer casing 1f and the inner casing 2f which is located in the outer casing 1f hold solution 9 therebetween, and the inner casing 2f is submerged in the solution 9. The gas burner 30 is attached to the outer surface of the inner casing 2f, and the inner casing 2f defines therein a combustion chamber 11F. Liquid chambers 12 are defined between the outer casing 1f and the inner casing 2f, and the plurality of solution tubes 3 which are communicated with the liquid chamber 1 above and below the inner casing 2, are laid in the combustion chamber 11F on the downstream side thereof, and are filled therein with the solution 9.

The solution tubes 3 have a thin ovoid sectional shape, and are arranged in one row in which their planar straight line parts are parallel with each other. The combustion gas passages are defined between the adjacent solution tubes 30, and fins 16 are formed on the outer surface, on the combustion gas side, of the solution tubes 3, the number of the fins 16 being larger on the gas burner 30 side of the solution tubes 3 than that on the smoke stack side thereof. A solution inlet pipe 5F is laid in the lower part of a side surface of the outer casing 1f so as to cause dilute solution to flow into the outer casing 1f from the lower part of a solution passage. Further, the gas-liquid separator 44 outside and above the outer casing 1f is connected to the top part of the outer casing 1 through the intermediary of a gas/liquid riser pipe 40, and incorporates a gas-liquid separator outer cylinder 41, and a solution outlet pipe 42 and a coolant vapor outlet pipe 43.

According to this variant form, the gas-liquid separator 44 is separated from the body of the regenerator, and accordingly, the height of the body can be lowered, and therefore, it is possible to aim at making the high temperature regenerator small-sized in its entirety, thereby it is possible to save resources.

Figure 16:
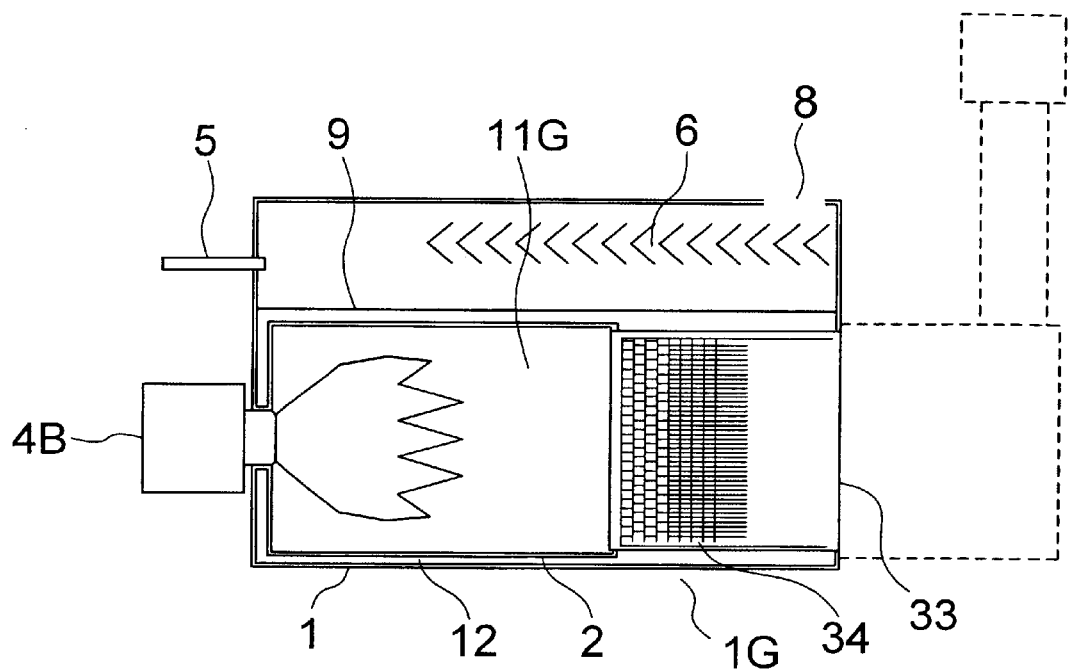
FIG. 16 is a longitudinal sectional view illustrating the high temperature regenerator shown in FIG. 15.
Figure 17:
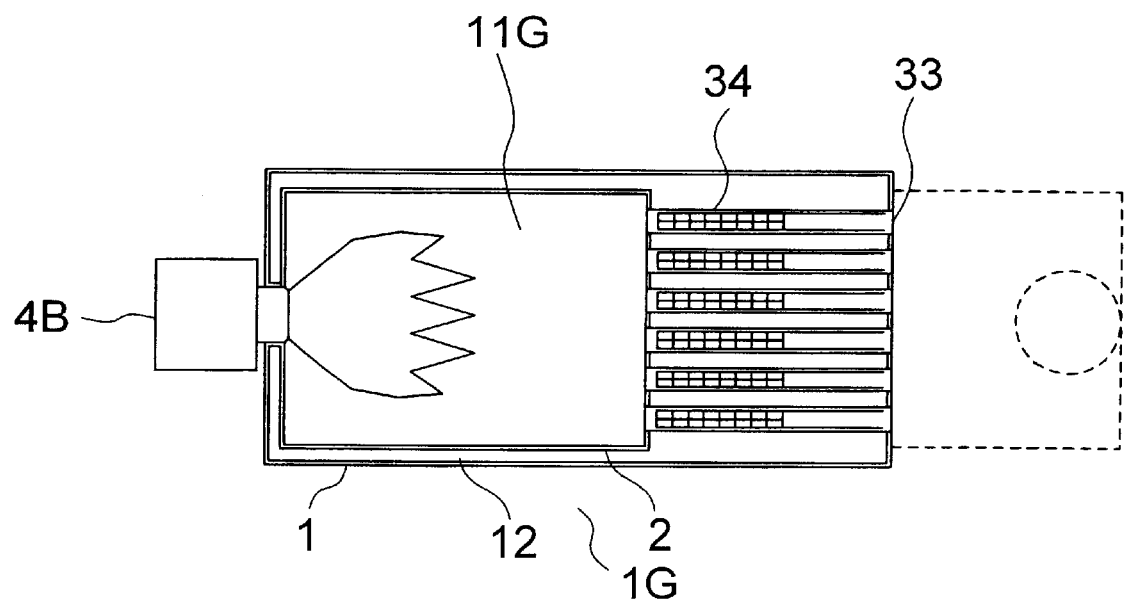
FIG. 17 is a cross-sectional view illustrating the high temperature regenerator shown in FIG. 15.

Explanation will be made of another variant form of the above-mentioned second embodiment with reference to FIGS. 15 to 17.

Figure 15:
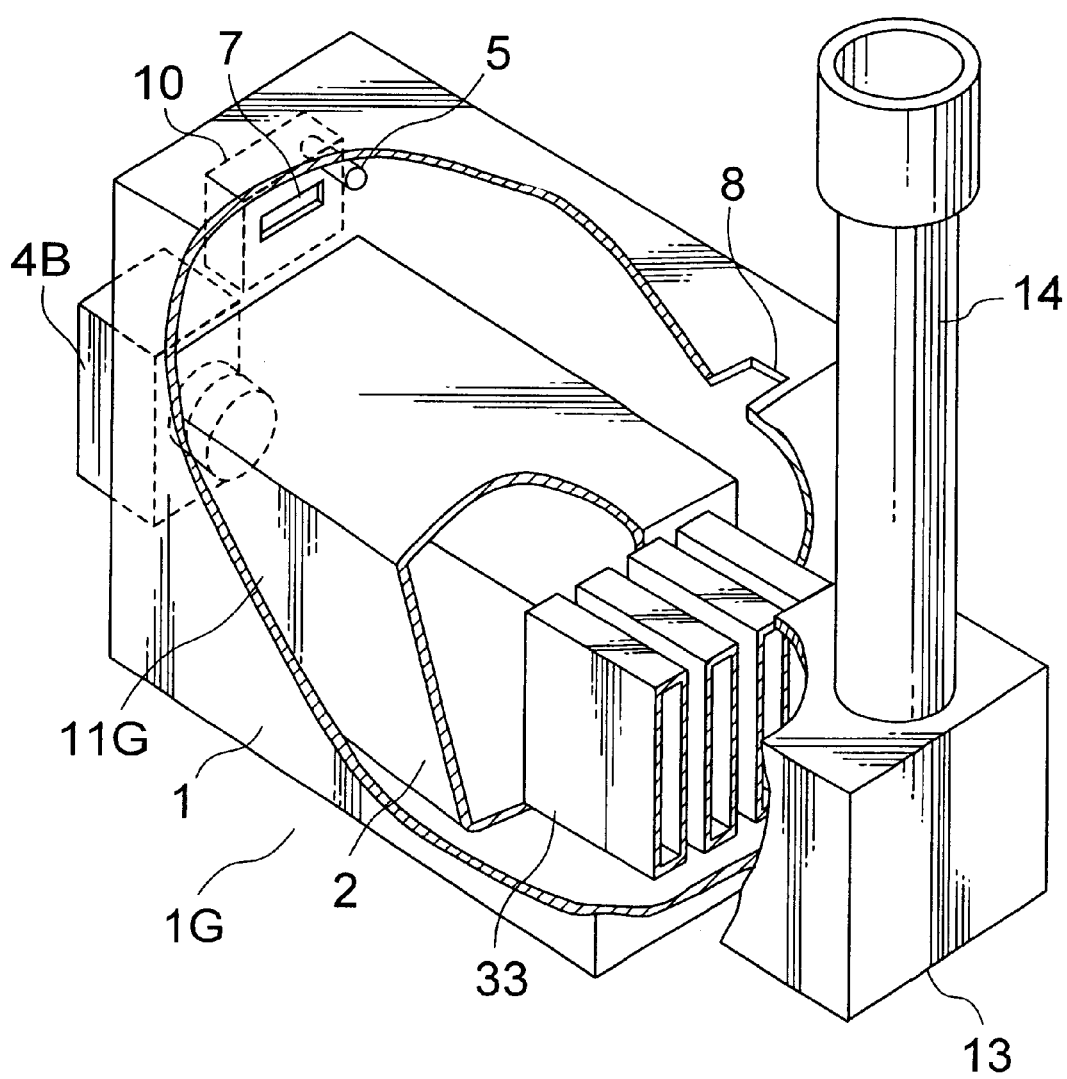
FIG. 15 is a partly sectioned perspective view illustrating further another variant form of the second embodiment of high temperature regenerator.

FIG. 15 is a partly sectioned perspective view illustrating a high temperature regenerator. FIG. 16 is a longitudinal sectional view illustrating the high temperature regenerator shown in FIG. 15, and FIG. 17 is a cross-sectional view illustrating the high temperature regenerator shown in FIG. 15. In these figures, like reference numerals are used to denote like parts to those shown in FIGS. 5 and 6.

The high temperature regenerator 1G is composed of an outer casing 1 and an inner casing 2, a plurality of flue tubes 33, a burner 4B, a solution inlet pipe 5 and a mist separator 6. The outer casing 1, the inner casing 2 which is located in the outer casing 1, and the flue tubes 33 hold solution 9 therebetween, and the inner casing 2 and the flue tubes 33 are submerged in the solution 9. The burner 4B is extended through the inner casing 2 and is attached to the outer surface of the outer casing 1, and the inner casing 2 defines therein a combustion chamber 11G. Liquid chambers 12 are defined by the outer casing 1 and the inner casing 2 and the flue tubes 33, and the plurality of flue tubes 3 which are extended through a rear tube head of the outer casing 1 from the downstream outer wall surface of the combustion chamber.

The flue tubes have a rectangular vertically sectional shape, and are arranged in one row in which straight line parts of the flue tubes on the longer side of the rectangular are parallel with one another. Solution passages are defined between the adjacent flue tubes 33. Fines 34 are formed at the inner surfaces of the flue tubes 33, that is, at the outer surface, on the combustion gas side, of the flue tubes 33, the number of the fines being larger on the burner 4B side than that on the smoke stack 14 side. Further, a solution inlet pipe 5, and a mist separator 6 is laid in the outer casing 1 above the solution 9, a solution outlet hole 7 is formed in one side of the outer casing 1, and a coolant vapor outlet hole 8 is formed in the top surface thereof.

A float box 10 is communicated with the outer casing 1 by means of the solution outlet hole 7, and the solution inlet pipe 5 is extended through the float box 10 and is communicated with the outer casing 1. A float valve (which is not shown) is provided in the solution inlet pipe 5 within the float box 10, and accordingly, the flow rate of the solution fed into the high temperature regenerator 1G is adjusted in accordance with a level of the solution in the float box 10.

Combustion gas from the burner 4B heats the solution 9, mainly by radiant heat transfer through the intermediary of the wall surfaces of the inner casing 2, and thereafter it runs through the plurality of flue tubes 33 while it heats the solution 9 in the vicinity of the flue tubes 33 through convention heat transfer before it flows into a funnel box 13. Then, it is exhausted into the outside through a smoke stack 14 connected to the top part of the funnel box 13.

The heated solution 9 is boiled so as to produce coolant vapors which ascend in the form of a rise-up flow through passages defined between the adjacent flue tubes 33 and flow passages between the outer casing 1 and the inner casing 2. Then, the coolant vapors come out above the liquid surface, and flow out from the coolant vapor outlet hole 8 into a coolant pipe line (which is not shown) by way of the mist-separator 6.

Meanwhile, the dilute solution is led through the solution inlet pipe 5 and into the high temperature regenerator 1G in which it is heated and boiled, and the solution thus having a high concentration is fed into the float box 10 though the solution outlet hole 7. The solution is once reserved in the float box 10 so as to form a liquid surface, and then flows out into a solution pipe line (which is not shown).

As mentioned above, according to this variant form, since a large number of the fins 34 are formed on the outer surfaces, on the combustion gas side, of the flue tubes 33 on the burner 4B side, the heat flux of the solution tubes 3 on the burner 4B side is high, but since no fins 34 are formed on the outer surface, on the combustion gas side, of the flue tubes 33 on the smoke stack 14 side, the heat flux of the flue tubes 33 on the smoke stack 14 side is low. As a result, the solution between the flue tubes 3 creates a rise-up flow on the burner 4B side but creates a fall-down flow on the smoke stack 14 side so that the liquid flow exhibits a spiral flow. Thus, the stagnation of the solution can be prevented, and the ascending flow speed can be increased in the high heat flux zone. Accordingly, the boiling heat transfer coefficient can be enhanced in the combustion gas inlet part, thereby it is possible to lessen corrosion and deterioration of the liquid flue tubes 33.

Although the examples in which the fins are formed on the heat-exchanger tubes on the burner side, but no fins are formed on the same on the smoke stack side have been explained in the above-mentioned embodiments and in the variant forms thereof, the present invention should not be limited by the above-mentioned examples, the fins may be formed so as to allow the heat flux to be higher on the burner side of the heat-exchanger tubes than that on the smoke stack side, and accordingly, even though the fins are formed on the smoke stack side thereof, the flow of solution can create a spiral flow. Thus, the stagnation of the solution can be prevented, and since the rise-up flow speed can be increased in the high heat flux zone, the boiling heat transfer coefficient of the combustion gas inlet part can be enhanced, thereby it is possible to obtains effects similar to those obtained by the configurations of the above-mentioned embodiments.

Further, in the above-mentioned embodiments and the variant forms thereof, the control of the heat flux is carried out by the heat transfer fins, but instead of the heat transfer fins, a heat transfer promoter such as a baffle or a turbulence promoter may be provided in order to obtain similar effects.

It is noted that the high temperature heat-generator in the above-mentioned embodiments and variant forms thereof have been explained as those for absorption water cooling and heating machines, but they can be also used for absorption refrigerators specified in JIS B 8622-1994.

As have been explained in detail, according to the present invention, the flow of the solution creates a spiral flow, the stagnation of the solution can be prevented, and since the rise-up flow speed can be increased in the high heat flux zone, the boiling heat transfer coefficient can be enhanced in the combustion gas inlet part. As a result, it is possible to provide a high temperature regenerator for an absorption water cooling and heating machine, which can lessen corrosion and deterioration of the liquid side heat transfer surface, and accordingly, which can have a long use life, a high degree of reliability, and can save energy and be small-sized.

Further, according to the present invention, the circulation volume of the solution can be controlled during partial load operation, and accordingly, it is possible to provide a high temperature regenerator for an absorption water cooling and heating machine which can carry energy saving operation, and which can restrain generation of thermal NOx so as to aim at lowering the emission of NOx.

What is claimed is:

1. A high temperature regenerator for an absorption water cooling and heating machine, including a burner generating a flame, a combustion chamber, a solution passage, a coolant vapor outlet passage, a gas exhaust passage, and outer and inner casings between which liquid chambers for reserving dilute solution are defined, the combustion chamber being defined in the inner casing so as to heat the solution in order to extract coolant vapors from the solution, characterized by a plurality of solution tubes provided in the combustion chamber, communicated with liquid chambers located above and below the inner casing and having a sectional shape which is thin ovoid-like in the flowing direction of combustion gas, where the plurality of solution tubes are provided in the vicinity of the burner so as to be located in the flame from the burner, and a space defined in the combustion chamber downstream of the plurality of solution tubes.

2. A high temperature regenerator for an absorption water cooling and heating machine, including a burner, a combustion chamber, a solution passage, a coolant vapor outlet passage, a gas exhaust passage, outer and inner casings between which liquid chambers for reserving dilute solution are defined, the combustion chamber being incorporated in the inner casing so as to heat the solution in order to extract coolant vapors from the solution, characterized by a circulation volume control means for the solution in the high temperature regenerator, a combustion control means, a heat-exchanging means for carrying out heat-exchange between the combustion gas and the solution, and a gas-liquid separating means, the heat-exchanging means being composed of a first bank of tubes which are located in the vicinity of the burner so as to be located in the flame from the burner and which are planer along the flowing direction of the combustion gas, and a second bank of tubes which are located in the vicinity of the combustion gas exhaust passage and which are planer along the flowing direction of the combustion gas, and a space defined between the first and second banks of tubes.

3. A high temperature regenerator for an absorption water cooling and heating machine as set forth in claim 2, characterized in that, in the first tube bank, the solution tubes have outer surfaces provided with no heat transfer fins, and in the second tube bank, the solution tubes have outer surfaces provided with heat transfer fins provided at least on an upstream side thereof, and in that a downstream side thereof has a smaller number of heat transfer lines than the upstream side or has no heat transfer fins.

4. A high temperature regenerator for an absorption water cooling and heating machine, including a burner, a combustion chamber, a solution passage, a coolant vapor outlet passage, a gas exhaust passage, outer and inner casings between which liquid chambers for reserving dilute solution are defined, the combustion chamber being defined in the inner casing so as to heat the solution in order to extract coolant vapors from the solution, characterized in that a plurality of flue tubes for guiding combustion gas from the combustion chamber to a funnel by connected to the combustion chamber, the flue tubes defining therebetween passages for the solution and having a sectional shape which is long perpendicular to the flowing direction of the combustion gas, and in the vertical direction, have outer surfaces provided with heat transfer fins provided at least on an upstream side thereof, and in that a downstream side thereof has a smaller number than the upstrean side or has no heat transfer fins.

5. A high temperature regenerator for an absorption water cooling and heating machine as set forth in any one of claims 1 to 3, 4 is characterized in that the solution passages defined between the combustion gas passages are not communicated with the lower liquid chamber.

* * * * *